United States Patent [19]

Clement et al.

[11] Patent Number: 4,815,319

[45] Date of Patent: Mar. 28, 1989

[54] SYSTEM FOR DETERMINING THE MOVEMENT OF A TRACK VEHICLE

[75] Inventors: Gilles Clement, Paris; Jean-Marie Detriche, Noisy le Roi; Eric Villedieu, Palaiseau, all of France

[73] Assignee: Protee Groupement d'interet economique, Paris, France

[21] Appl. No.: 133,001

[22] Filed: Dec. 15, 1987

[30] Foreign Application Priority Data

Jan. 5, 1987 [FR] France .................. 87 00016

[51] Int. Cl.⁴ .................. G01P 3/56; G01P 13/00
[52] U.S. Cl. .................. 73/493; 73/510; 73/865.9; 180/6.7
[58] Field of Search .............. 73/865.9, 493, 495, 73/509, 510; 180/6.7

[56] References Cited

U.S. PATENT DOCUMENTS

| | | | |
|---|---|---|---|
| 4,410,952 | 10/1983 | De Vlieg et al. | 364/565 |
| 4,448,145 | 5/1984 | Harvieu | 37/56 X |
| 4,530,237 | 7/1985 | Barria | 73/510 X |
| 4,630,685 | 12/1986 | Huck, Jr. et al. | 73/505 X |

FOREIGN PATENT DOCUMENTS

A10038606 10/1981 European Pat. Off. .
A2302901 10/1976 France .

*Primary Examiner*—Tom Noland
*Attorney, Agent, or Firm*—Ladas & Parry

[57] ABSTRACT

A system determines the movement of a track vehicle along the ground, the track vehicle having at least a first rotatable, endless track for supporting the vehicle on the ground, a drive for causing the movement of the vehicle, and a turning system for changing the direction of the movement of the vehicle. The system has a first traction-improvement device for mounting on the track vehicle. It bears on an inner-surface side of the first track with sufficient pressure for a small-surface portion on the opposite side of the first track to engage the ground with a higher pressure than any other portion of the first track, whereby to locate a pivoting axis of the track vehicle in the vicinity thereof. A first speed sensor for mounting on the track vehicle in the vicinity of the small-surface portion on the opposite side of the first track senses the speed of movement of the track vehicle along the ground only in the direction of the rotation of the first track and provides a first information thereof, whereby the movement of the track vehicle may be deduced therefrom. Preferably the vehicle has two tracks, and the system has two such traction-improvement devices and speed sensors respectively for the two tracks.

8 Claims, 1 Drawing Sheet

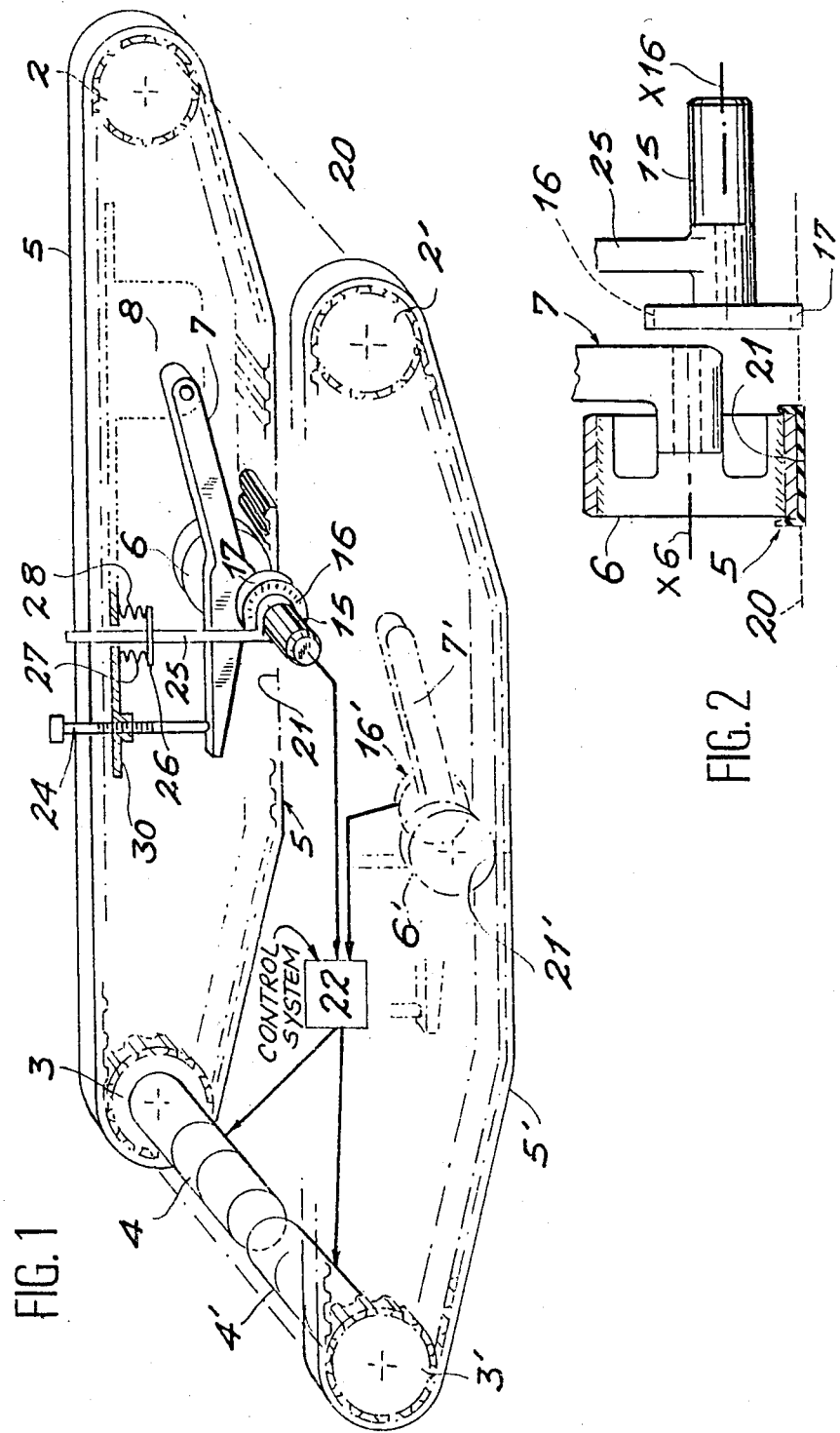

SYSTEM FOR DETERMINING THE MOVEMENT OF A TRACK VEHICLE

BACKGROUND OF THE INVENTION

1. Field of the Invention

The prevent invention relates to a system for determining the movement of a track vehicle and, particularly, programmed or remotely controlled movement.

2. Description of the Art

Rotatable, endless tracks are widely used for movably supporting military, industrial and robot vehicles, such as those used in the nuclear industry, for example. Good traction, as well as a reliable, robust design are characteristic of such vehicles. However, a disadvantage occurs for such vehicles when moved without human intervention and, particularly, for robots intended to travel a predefined path.

More specifically, turning a self-propelled, two-track vehicle is controlled as a function of different rotational speeds and, possibly, directions of driving wheels for the respective tracks. There is variable traction between tracks and the ground, however, so that it is impossible to determine from such control even the pivoting center of the vehicle. The resulting loss of precision regarding the position of the vehicle is unacceptable.

Moreover, even in the case of a rectilinear displacement, the tracks can skid if the ground traction becomes inadequate and the transmission of the movement thereof produced by the engine is no longer ensured. Even in the case of a sufficiently adhesive ground surface, it is not possible to prevent some skidding caused in regulating the speed of the tracks.

The movement of the driving wheels and tracks cannot, therefore, characterize the path of such a vehicle along the ground. Account must be taken of this when choosing sensors for control devices for fixing the position and speed of the vehicle.

The maneuverability of the vehicle and, in particular, its ability to pivot when cornering can be improved by slightly raising the front and rear parts of the tracks, as described in French Pat. No. FR-A-2 302 901. The part of each track which is closest to the ground is also kept curved with the aid of a Teflon (polytetrafluoroethylene) bar, which rubs on the inner surface of the track to provide convexity to the latter, oriented downwards. Over at least part of the length of the track, the action of the bar can be completed by castors. However, this design does not make it possible to obtain accurate information on the pivoting axis of the vehicle and is accompanied by a loss of traction on the ground, which can only be accepted because the vehicle is provided with supplementary tracks, which can be raised when cornering.

SUMMARY OF THE INVENTION

The object of the present invention is to obviate the disadvantages of the known devices and, in particular, to provide a system for determining the movement of a track vehicle from the position of its pivoting axis and at least one speed sensor near the pivoting axis, which measures the movements of the vehicle of the ground.

The preferred combination of two laterally spaced sensors separately measuring the advance of the vehicle on the ground makes it possible, by comparing their informations, to deduce forward and rotary movements of the vehicle.

These sensors are preferably reversible coding wheels which have rotation axes parallel to the ground, which run on the latter without slipping and which have the double advantage of supplying easily usable informations, unlike a coding ball for both informations, and being able to measure reverse travels of the vehicle accurately, because they are reversible.

More specifically, the invention relates to a two-track vehicle movement determination system characterized by an arrangement for each track for improving the traction on that track, speed sensors on the vehicle for measuring the speed of the vehicle with respect to the ground at a point in the vicinity of respective track traction-improvement points and a device for deducing the movement of the vehicle by comparing the informations collected by the sensors.

In this embodiment, each arrangement for improving the traction comprises a traction-improvement wheel having an axis parallel to the ground and perpendicular to the direction of displacement of the track running on the inner surface of the track and engaging the latter with the ground with the aid of a mechanical pressure application device.

In this embodiment, each sensor is a coding wheel having an axis parallel to the ground and perpendicular to the displacement direction of the respective track running without slipping on the ground and engaged with the latter with the aid of a mechanical device equipped with return means.

Advantageously, the axes of the coding wheels and the wheels for the ground traction improvement are located in the vicinity of the vertical projection of the barycenter of the vehicle.

BRIEF DESCRIPTION OF THE DRAWINGS

The invention is described in greater detail hereinafter relative to non-limitative embodiments shown in the attached drawings, wherein:

FIG. 1 is a perspective side elevation of a first embodiment with, partly broken away and in section, a two-track vehicle equipped with the first embodiment; and FIG. 2 is a partial view of the first embodiment and vehicle of FIG. 1.

DESCRIPTION OF THE PREFERRED EMBODIMENTS

FIG. 1 shows two tracks 5, 5', which move a vehicle 30 (only partly shown) positioned above them. Each of them is arranged around two end wheels, respectively 2, 3 and 2', 3'. Wheels 3, 3' are driving wheels and each is located at the end of a geared motor 4, 4' controlled by an on-board control system 22, which also provides information on the movement of the vehicle, i.e. its speed and position.

Each of the tracks 5, 5' has an arrangement for locally improving the traction of the corresponding track with the ground. Each essentially comprises a traction-improvement wheel 6, 6', which bears on part of the inner surface of the corresponding track 5, 5' with the aid of a pressure application device, such as a lever 7, 7' carrying the axle of wheel 6, 6', respectively, articulated at one end 8 (only one indicated) to the vehicle 30 and maintained at its other end by the end of a pressure screw 24 engaged in the chassis of the vehicle 30. Thus, that small-surface portion 21, 21' of the track 5, 5' located beneath the wheel 6, 6' respectively, on the opposite side of the track 5, 5' is engaged against ground 20 with a higher pressure than any other portion of the track 5, 5'. The friction of the vehicle on the ground 20 is thus mainly located on surfaces 21, 21' of tracks 5, 5' so that the vertical pivoting axis of the vehicle is secant with the axis joining these quasi-punctiform surfaces 21, 21'.

For measuring displacements of the vehicle sensors are in contact with the ground close to the respective surfaces 21, 21' where the displacement of the vehicle is most accurately known. Each sensor advantageously comprises a coding wheel 16, 16' which rolls without sliding on ground surface 20 by means of an adhesive tire 17 placed on its rim. As shown only for coding wheel 16, each coding wheel is mounted on a return device, such as a vertical rod 25, at one end of which the coding wheel 16 rotates and at the opposite end of which is a bearing support 26 for the compression springs 27, 28 also connected to the chassis of vehicle 30.

An optical pulse generator 15 is also connected to rod 25 and positioned facing coding wheel 16 to transmit information relating to the rotation speed thereof to the control system 22, which controls the geared motor 4. A similar sensor equips the other track 5'.

Thus, the overall displacement of the vehicle is expressed as a function of the rotation of the coding wheels 16, 16' located in the vicinity of surfaces 21, 21'. The means value of their displacement informations corresponds to the longitudinal displacement of the vehicle, whilst their difference is linked with the pivoting of said vehicle. These informations are calculated by control system 22, which deduces therefrom the vehicle movement characteristics, i.e. its longitudinal speed, its rotational speed and, therefore, following time integration, its movements and, thus, position. The real movement is constantly adjusted to follow a previously defined path stored by the control system 22 modifying the speeds imparted to the geared motors 4, 4'.

The sensor described hereinbefore has a number of advantages. It is easy and inexpensive to manufacture, it has high reliability and it can be used both during forward and reverse travel of the vehicle. However, the use of other speed sensors can be envisaged, e.g. acoustic or ultrasonic sensors with Doppler effect or optical sensors not in contact with the ground, but still within the scope of the invention.

Preferably, the ground adhesion improvement device on track 5' and the corresponding speed sensor are positioned strictly symmetrically to those described for track 5. The operation of tracks 5, 5' is then identical, which improves vehicle stability.

The lateral position of the pivoting axis of the vehicle is at a point on the line joining the quasi-punctiform surfaces 21, 21'. The transverse position of this point is dependent on the speeds of the two tracks 5, 5' applied by geared motors 4, 4' with the aid of control system 22. Thus, with two equal speeds in opposite directions, the pivoting axisis equidistant of the two tracks, and possibly very close to the vertical projection of the barycenter of the vehicle, and consequently, the stability of the latter is further improved.

It is therefore advantageous for the barycenter of the vehicle to have a vertical projection passing in the vicinity of the line joining the two quasi-punctiform surfaces 21, 21'. It is also advantageous for this vertical projection to pass in the vicinity of the rotational axes X6 and X16 of the traction-improvement wheels 6, 6' and coding wheels 16, 16'.

Thus, the present invention makes it possible to accurately check or control the movement of a track vehicle. The ground traction-improvement device also facilitates cornering by reducing friction, which reduces energy consumption. These two main advantages make the system very interesting, particularly for robots for a predetermined path, as used in factories and nuclear installations, or also for military application.

We claim:

1. A system for determining movement on the ground of a vehicle (30) driven by rotatable endless, flexible tracks (5, 5'), wherein the system comprises, for each of at least two tracks (5, 5') of the vehicle (30), traction-improvement means (6 to 8, 24) for improving at one point (21) the traction of the track (5, 5'), and a speed sensor (15, 16) on the vehicle (30), the speed sensor (15, 16) measuring the speed of the vehicle (30) relative to the ground (20) at a point in the vicinity of the traction-improvement point (21), and for the system, control system means (22) for deducing the movement of the vehicle by comparing informations collected by the respective speed sensors.

2. A system according to claim 1, wherein the traction-improvement means comprises traction-improvement wheels (6, 6') having axes parallel to the ground and perpendicular to the displacement direction of the tracks (5, 5') in the rotation thereof, bearing on an inner surface of the respective tracks, and engaging a small-surface portion on the opposite side of the latter with the ground with a higher pressure than any other portion thereof.

3. A system according to claim 2, wherein the speed sensors are coding wheels (16, 16') having axes parallel to the ground and perpendicular to the displacement direction of the tracks (5, 5') and respective bearing means (25-28) for rolling the coding wheels (16, 16') without sliding on the ground (20).

4. A system according to claim 3, wherein the rotation axes of the traction-improvement wheels (6, 6') and the coding wheels (16, 16') pass in the vicinity of the vertical projection of the barycenter of the vehicle.

5. A system according to claim 1, wherein the traction-improvement means and sensors are in a symmetrical arrangement.

6. A system for determining movement of a track vehicle along the ground, the track vehicle having at least one rotatable, endless track for supporting the vehicle on the ground, movement means for causing the movement of the vehicle, and turning means for turning the movement of the vehicle, the system comprising:

a first traction-improvement means for mounting on the track vehicle, the first traction-improvement means bearing on an inner-surface side of a first endless, rotatable track of the track vehicle with sufficient pressure for a small surface portion on the opposite side of the first track to engage the ground with a higher pressure than any other portion of the first track, thereby locating a pivoting axix of the track vehicle in the vicinity thereof; and a first speed sensor for mounting on the track vehicle in the vicinity of the small-surface portion on the opposite side of the first track, the first speed sensor being for sensing the speed of movement of the track vehicle along the ground only in the direction of the rotation of the first track and providing a first information thereof, whereby the movement of the track vehicle may be deduced therefrom.

7. The system of claim 6, wherein the track vehicle has a second such track, both of the first and second tracks being rotatably driven for the movement of the track vehicle, and the system further comprises:
- a second traction-improvement means and a second speed sensor like the first, but operative with the second track, the second speed sensor providing a second information of the movement of the track vehicle along the ground; and
- control system means for deducing the movement of the track vehicle by comparing the first and second informations.

8. The system of claim 7, wherein the deduction of the movement of the track vehicle by the control system means comprises deducing the longitudinal displacement of the track vehicle from the means value of the informations, and deducing the pivoting of the track vehicle from the differences of the informations.

* * * * *